(No Model.) 3 Sheets—Sheet 2.
R. DREYER.
APPARATUS FOR THE MANUFACTURE OF LAMP BLACK.
No. 444,315. Patented Jan. 6, 1891.
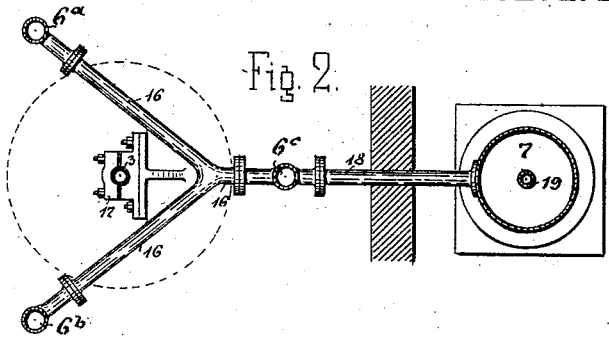
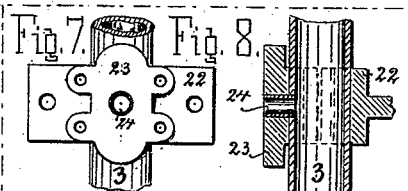
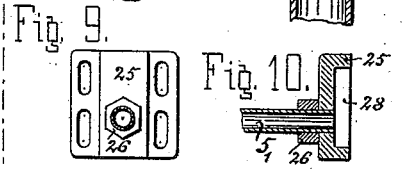
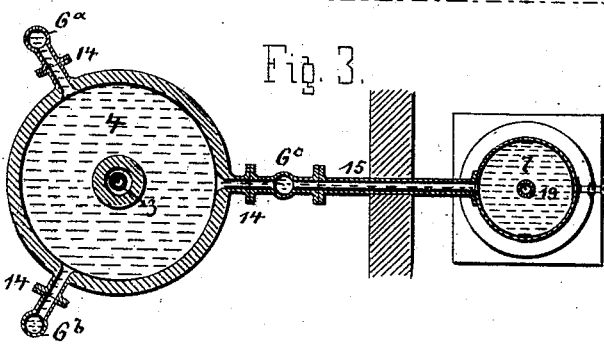
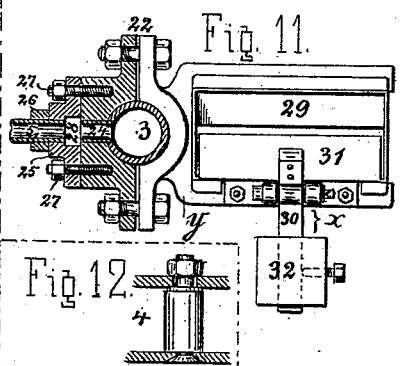
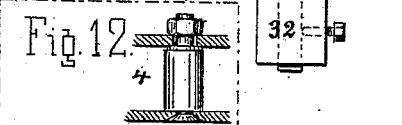
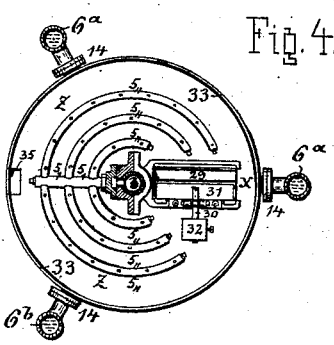
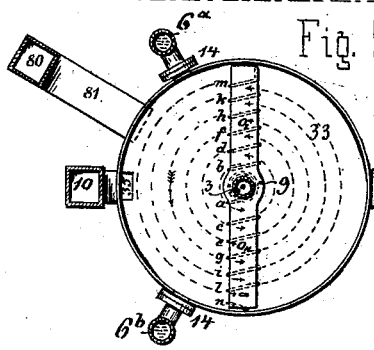
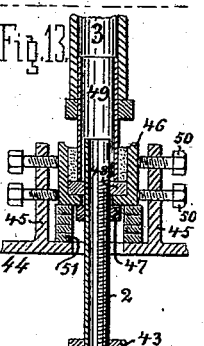
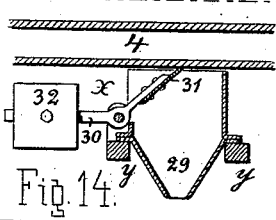
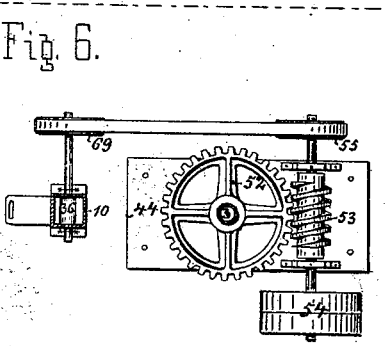
Witnesses:
Inventor:
by Rob. Dreyer.
Att'ys.

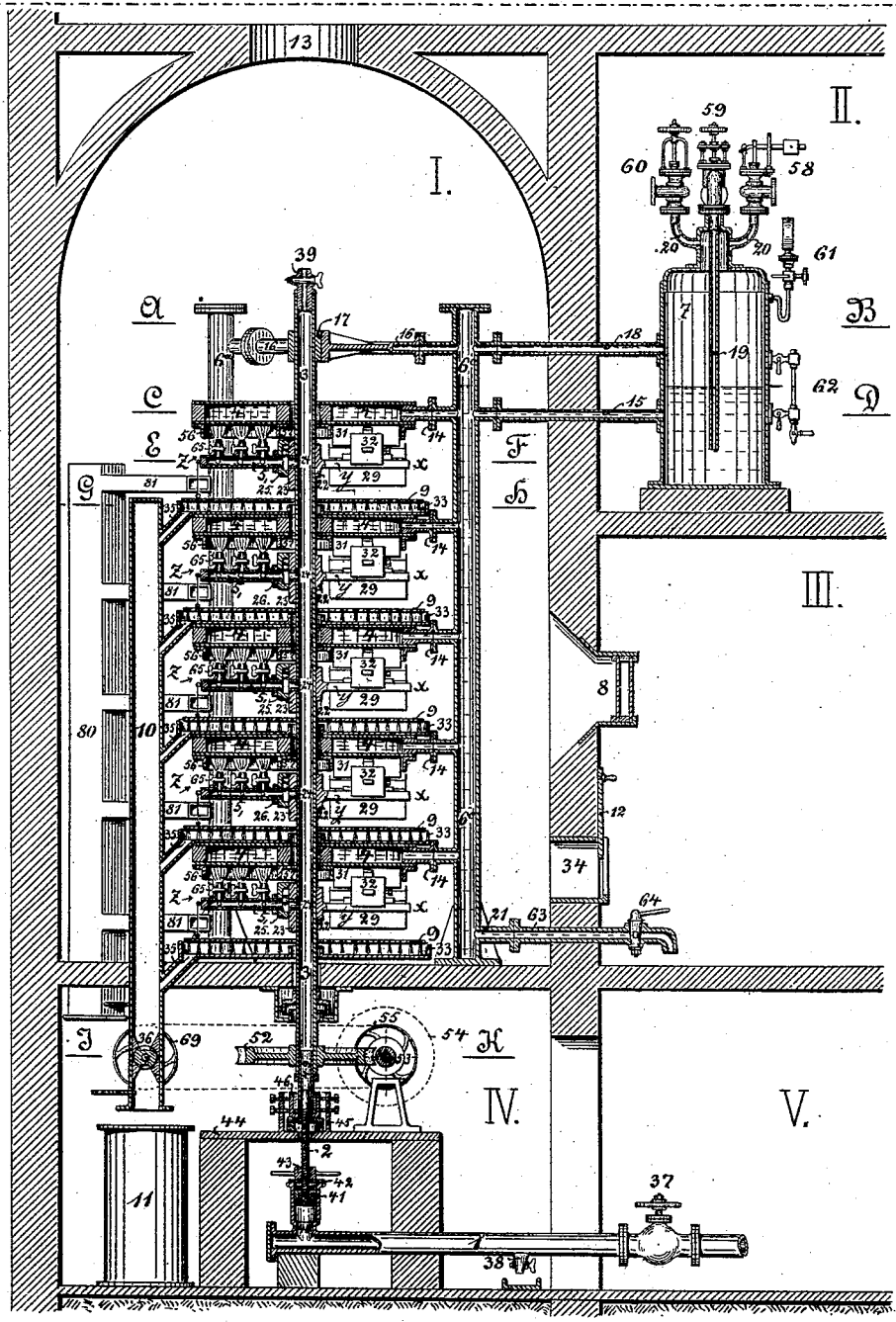

(No Model.) 3 Sheets—Sheet 3.
R. DREYER.
APPARATUS FOR THE MANUFACTURE OF LAMP BLACK.
No. 444,315. Patented Jan. 6, 1891.
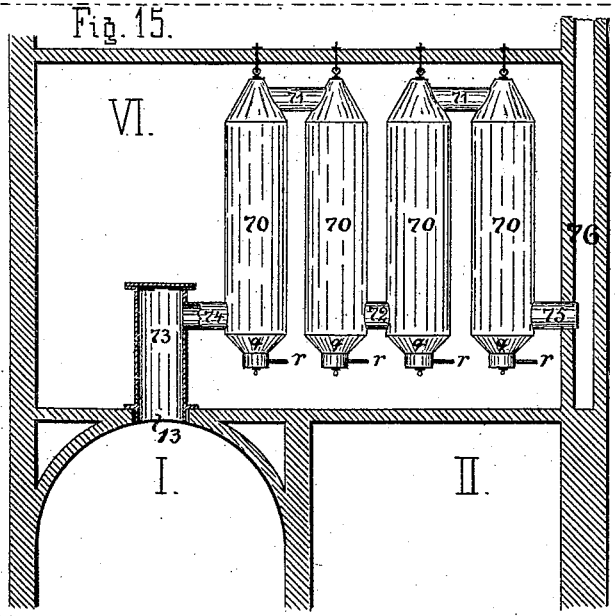
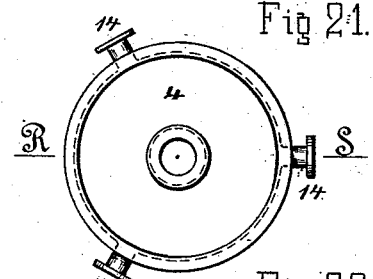
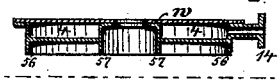
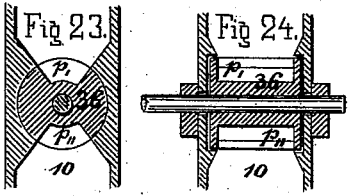
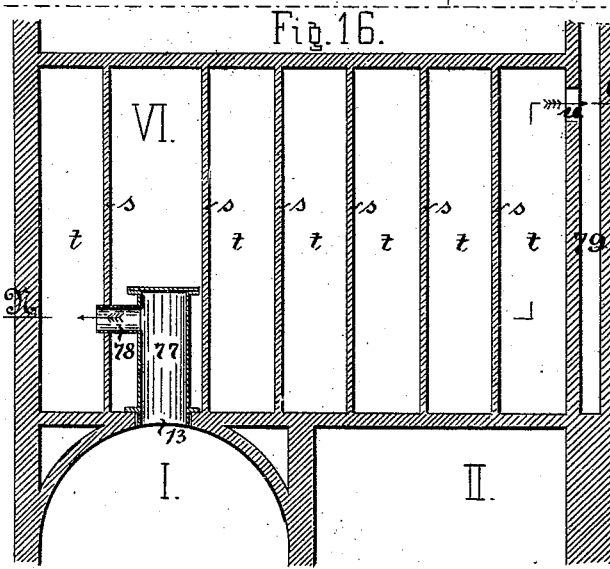
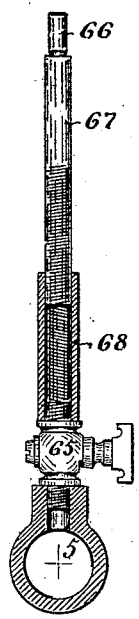
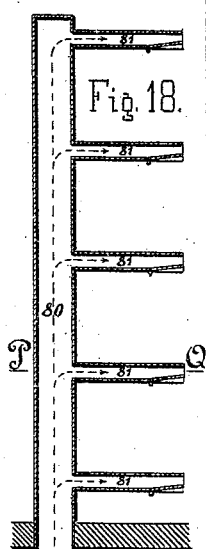
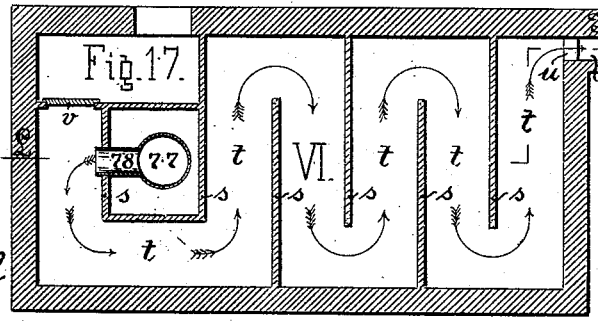
Witnesses:
Inventor:
by Rob. Dreyer,
Munn & Co.
Att'ies.

UNITED STATES PATENT OFFICE.

ROBERT DREYER, OF HALLE-ON-THE-SAALE, PRUSSIA, GERMANY.

APPARATUS FOR THE MANUFACTURE OF LAMP-BLACK.

SPECIFICATION forming part of Letters Patent No. 444,315, dated January 6, 1891.

Application filed July 30, 1888. Serial No. 281,372. (No model.) Patented in Germany October 6, 1887, No. 3,907.

*To all whom it may concern:*

Be it known that I, ROBERT DREYER, of Halle-on-the-Saale, in the Kingdom of Prussia and German Empire, have invented a new and useful Contrivance for Producing Soot and Simultaneously Generating Steam, of which the following is a specification, reference being had therein to the accompanying drawings, (no patents being obtained by me anywhere for this invention, except in the German Empire by Letters Patent No. 3,907, dated October 6, 1887, and to commence on January 25, 1887.)

My invention relates to the construction of an improved apparatus for the production of lamp-black, soot, or carbon-black from natural or artificial carbureted hydrogen gases, or from suitable oily or fatty substances, and at the same time utilizing the heat generated during this process.

In the accompanying drawings, forming part of this specification, Figure 1 is a vertical section of the apparatus; Fig. 2, a horizontal section of same on the line A B, Fig. 1; Fig. 3, the same, line C D; Fig. 4, the same, line E F; Fig. 5, the same, line G H; Fig. 6, the same, line I K; Fig. 7, tube-holding frame; Fig. 8, vertical section of same; Fig. 9, slide of tube-holder; Fig. 10, vertical section of Fig. 9; Fig. 11, a section of tube-holding frame and view of the scraper; Fig. 12, view of holding-bolt; Fig. 13, vertical section of distance-regulating mechanism attached to the vertical main shaft; Fig. 14, a vertical section of the scraper; Fig. 15, a view of bag device for soot-deposition; Fig. 16, vertical section of chamber II, line L M, Fig. 17, with its subdivisions; Fig. 17, horizontal section of chamber II, line N O, Fig. 16; Fig. 18, horizontal section of air-supply-pipe branches. Fig. 19 is a section of the air-supply pipe, line P Q, Fig. 18; Fig. 20, view of adjustable gas-jet, enlarged scale; Fig. 21, plan of cooling-vessel, lid broken; Fig. 22, vertical section of cooling-vessel, line R S, Fig. 21; Figs. 23 and 24, vertical and horizontal section of roller situated at the lower end of delivery-pipe, enlarged scale.

In order to attain the best results with regard to quality and quantity of lamp-black, it will be found that the following are the most essential points to be looked after, namely: first, a perfect regulation of the burner and control of air-supply; second, it is necessary that the metal plates on which the black is deposited should be kept at a certain temperature, since the plate becoming too hot the deposition of black will be burned, and the plates being too cool the deposition of black is delayed and aqueous condensations mixed with the black; third, to avoid the burning of the carbon-black deposited on the metal plates it is necessary that the latter should be adjustable so that the distance between the burner and plates, may be regulated easily, as required; fourth, the utilizing of the carbon not deposited on the metal plates by depositing the same in certain chambers before escaping with the products of combustion to the chimney and molesting the neighborhood by excess of smoke; fifth, for sanitary reasons the arrangement of the plant must be made in such a manner that workmen will have little or nothing to do in the chamber of carbon deposition; sixth, the utilizing of the heat generated by the combustion of carbureted gases or oils; seventh, to save expenses the plant should be so constructed that it takes the least possible space.

I shall now describe the means by which I attain a better and safer production of lamp-black than has heretofore been done.

The material for combustion—gas or oil—enters the vertical rotating main shaft 3 through the pipes 1 and 2, Fig. 1. This main shaft is surrounded by a number of closed cooling-vessels 4 4, situated one above the other, with a system of adjustable burners under each of them. The cooling-vessels 4 4 are connected by branch pipes with the main pipes $6^a$ $6^b$ $6^c$ and by these latter pipes with the steam-collector 7. The lower part of this collector contains the cooling-liquid which flows through the pipes $6^a$ $6^b$ $6^c$ to the cooling-vessels 4 4 4, while the heat and steam generated in the coolers are conducted in the opposite direction to the upper part of the steam-collector. In combination with every system of burners is a scraper $x$ for the removal of carbon deposited on the metal plates of the cooler. The carbon falls into the trough 33, where it is carried by rake 9 to the delivery-pipe 10, and from there to the cask 11. The whole plant is located in five different chambers. In chamber I is erected the apparatus for the production of the carbon or lamp-black; in chamber II the steam-collector. Room III serves for observation of carbon-producing apparatus, while room IV contains the lower end of the main shaft, with the pulleys for operating the same, and also a cask for collecting the carbon produced, the chamber IV being connected with chamber V by the gas-inlet pipe 1. The chamber I must have only two openings, one 34 at one side for the admission of atmospheric air and the other one 13 on the top of the vault for the passage of products of combustion. The admission of air by means of the opening 34 may be regulated by a slide 12. Atmospheric air may also be admitted to the chamber I by means of the tube 80 and its branches 81 81, leading directly to each system of burners, Figs. 1 and 5.

For the purpose of observing the working of the carbon-producing apparatus there is provided in the partition between the rooms I and II a window 8, closed by two panes of glass, as shown in Fig. 1. The main pipes $6^a$ $6^b$ $6^c$, Fig. 1, are connected by the couplings 14 14 with the cooling-vessels 4 4 4. The pipe $6^c$ receives the cooling material from the collector 7 by means of the pipe 15, and carries it to the coolers 4 4 4. The cooling-vessels 4 4 4 consist of the bottom plate on which the carbon is deposited, a removable top plate, and a ring forming the sides, the latter being provided with the couplings by which communication is had with the main pipes $6^a$ $6^b$ $6^c$. The top and bottom plates are united with the circumferential ring by means of bolts and nuts. Upon the lower face of the cooler 4, where the carbon-black is deposited, are attached two concentric rings 56 and 57, said rings forming vertical depending flanges between which the scraper rotates and preventing the carbon from being laterally dispersed by the action of the scraper. In case of using water as a cooling-liquid, it is necessary, on account of the pressure or the steam, to unite the top and bottom plates of the cooler 4 with extra bolts, Fig. 12, which are riveted into the bottom plates bearing nuts on their upper ends to secure the top plate. When using oil or other fatty substance as a cooling material, then the ring and bottom plate of the cooler may be made of one piece and the top plate of cast-iron no extra bolts being necessary, since the boiling-point of these substances is much higher and very little vaporization takes place. Above the cooling-vessels 4 4 are the pipes 16 16, communicating with the main pipes and with each other and having at their juncture the bearing 17 for the reception of the hollow main shaft 3. The steam generated in the coolers enters the main pipes $6^a$ and $6^b$ and passes by means of the pipe 16 16 and connecting-tube 18 to the collector 7, Figs. 1 and 2. The steam-collector is a cylindrical vessel, its lower part serving as a receptacle for the cooling material, the latter being admitted by the feeding-pipe 19, Figs. 1 and 3. The steam-collector is so situated and the level of the fluid kept at such a height that it stands about four inches higher than the bottom plate of the highest cooling-vessel 4. The main pipes and steam-collector form a steam-boiler, and in consequence the steam-collector is provided with a safety-valve 58, feeding-valve 59, and a steam-valve 60 and their connection 20, Fig. 1. Every main tube is formed at its lower end with a connecting-pipe 21, connecting with the pipe 63, carrying the faucet 64 in its forward end, in order to carry off the cooling-liquid. The object of using the steam-generators is to increase the temperature of the bottom plates where the carbon is to be deposited to more than 212° Fahrenheit, so that no condensation of vapors takes place and thoroughly dry carbon of the best quality is produced. In case water is to used as a cooling-liquid, a steam-pressure of four atmospheres may be used, in which case the depositing-plates would have a temperature of 300° Fahrenheit. A small steam-engine might then be used for the working of the main shaft of the carbon-depositing apparatus.

If oily or other fatty substances are to be used as a cooling-liquid, no steam-pressure is required, as oil has a much higher boiling-point than water. The oil and fatty vapors may be led direct into gas-retorts, and the gas manufactured in this way may be used again for the manufacture of carbon.

Underneath every cooler 4 is situated the heating apparatus Z, Fig. 4, consisting of semicircular tubes 5, provided with the gas-burners. Each heating apparatus Z is connected with the hollow main shaft by a peculiarly-constructed tube-holder frame. The distance of the burners from the carbon-depositing plate may be changed according to necessity, Figs. 7 and 8. On the plate 23 moves the slide 25, Figs. 9 and 10, on which is mounted the pipe 5' of the heating apparatus Z. This pipe 5' not being in the center of the slide 25 and held in communication with the hollow shaft 3 by means of the channel 28, the slide may in consequence be fastened at different heights relative to the cooler. Each burner has its own stop-cock 65, in order to be regulated according to pressure or the liquid to be brought to combustion.

Fig. 20 shows a modified burner, which may be elongated or contracted, as desired, by means of the thread on the tube 67.

While one half of the tube-holder frame, Figs. 11 and 14, carries the heating apparatus, the other half, in connection with the forks, serves as a support for the scraper and the funnel 29. The scraper consists of a lever 30, turning on a pivot, bearing on its shorter arm the steel plate 31 and on the larger arm the counter-weight 32. The heating apparatus Z and the scraper $x$ are kept in rotation by means of the shaft 3. The carbon deposited on the lower side of the bottom plate of the generator is scraped off by the scraper, falling into the small funnels 29 and from there into the trough 33, Fig. 5. In this trough rotates the rake 9, operated by means of the shaft 3, pushing the carbon fallen into the trough toward the peripheries of the latter and eventually into the channel 35, delivery-tube 10, and cask 11.

The rake 9 consists of a long narrow plate $O'$ $O''$, having the central opening for the reception of the central shaft 3. The lower side of this plate carries a number of small scoops or paddles from $a$ to $n$ in a sloping position, at a distance of from four to five inches from each other, and so situated that the middle of the scoops of one half of the plate enters the middle of the intermediate space of the other half at every rotation. The paddle $a$ pushes the carbon to $c$, this to $d$, until the last paddle $m$, being curved, brushes it into the opening 35. The paddle $n$ clears the interior rim of the plate. The delivery-pipe 10 ends in the chamber IV and is closed at its end by the roller 36 to prevent the entrance of atmospheric air into the pipe, and in consequence to the burners, Figs. 23 and 24. The roller is kept in slow rotation by the pulley 69, and has two concave recesses $p'$ $p''$ opposite each other for the delivery of the carbon into the cask 11. The inlet-pipe 1, conducting the gas or air into the hollow rotating shaft 3, bears in chamber V a cut-off valve 37 and in chamber IV the purging-cock 38. A similar cock 39 is mounted on the top of the hollow main shaft 3. The inlet-pipe 1 branches off by socket 40, Figs. 1 and 13, and by means of the threaded pipe 2, with its regulating-nut 43 and packing 41, connection is made with the hollow shaft 3. The upper part of pipe 2 passes through the foundation-plate 44, the latter forming the support for the pivot-box 45. The latter is held in its position by ring 47 and pivot-ring 48, on which latter stands the main shaft 3 with pivot 49. By rotating the nut 43 the pipe 2, and in consequence the hollow main shaft 3, with heating apparatus Z and scraper $x$, is raised or lowered in accordance to the height of the socket 40. The pivot-box 45 is held by screws 50 and supported by socket-plates 51. In the lower end of the main shaft 3 is mounted the gear-wheel 52, Figs. 1 and 6, in mesh with worm 53, driven by the pulley 54, by means of which the main shaft is brought to rotation. A second pulley 69, driven by pulley 55, causes the rotation of roller 36. It has been observed that not all the carbon produced is deposited on the cooling-plates, but that part of it escapes as smoke, together with the other products of combustion, through the chimney to the open air. To utilize this escaping smoke, carbon, or soot it is passed through opening 13 of chamber I to chamber VI, Fig. 15, situated above the latter, in which a number of bags 70 70 are suspended, through which the smoke passes before entering the chimney 76. Each bag has at its lower end a small funnel $q$, with slide $r$. The escaping smoke, passing through the bags, deposits soot in the latter, which falls by knocking gently against them into the funnel, from which it is removed by way of slide $r$. Instead of the bag device, the chamber W, Figs. 16 and 17, may be fitted with partitions for the deposition of soot in the manner already known.

I do not confine myself to the number of carbon-deposition plates as shown in the drawings, and there may be a greater or smaller number of the same. Instead of using a worm-wheel for the rotation of the main shaft, this may be accomplished by other means—for instance, by using beveled wheels.

In using gas or raw material for production of carbon the lower end of the main shaft is kept air-tight by the oil poured into the pivot-box; but in using oil or other fatty substances the oil in the pivot-box is to be replaced by mercury, or a separate stuffing-box has to be substituted.

What I claim, and desire to secure by Letters Patent of the United States, is—

1. An apparatus for the manufacture of lamp-black with simultaneous generation of steam, consisting of a hollow main shaft 3, with pivot-box 45, the cooling and steam-generating vessels 4 4, scraper 31, heating apparatus Z, the main pipes $6^a$ $6^b$ $6^c$, the steam-collector and reservoir 7 for cooling-liquid, the delivery-pipe 10, with channels 35, and at its lower end the roller 36, substantially as shown, for the purpose specified.

2. In an apparatus for manufacturing lamp-black, the combination of a series of closed reservoirs in communication with each other, means for supplying the same with a cooling-liquid, and a hollow rotary shaft carrying burners and scrapers, the said burners and scrapers being below the reservoirs, substantially as described.

3. In an apparatus for manufacturing lamp-black, the combination, with a series of reservoirs, a steam-collector, and connections between the collector and reservoirs, of a hollow vertically-adjustable shaft, burners secured to the shaft, scrapers secured to the said shaft on the side opposite the burners, and means for rotating the shaft, substantially as described.

4. In an apparatus for manufacturing lamp-black, the combination, with a steam-collector, of a series of reservoirs, pipes connecting the reservoirs with the collector, and burners arranged below the reservoirs, substantially as specified.

5. In an apparatus for manufacturing lamp-black, the combination, with a series of reservoirs and burners and scrapers below the same, of troughs below the burners and scrapers, a delivery-pipe connected to the troughs, and rotary rakes in the troughs for carrying the carbon to the delivery-pipe, substantially as herein shown and described.

6. In an apparatus for the manufacture of lamp-black with simultaneous generation of steam, the combination of the collector 7, the main pipes $6^a$ $6^b$ $6^c$ and their branches 14, leading to the cooling and steam-generating vessels 4 4, and branch pipes 16 18 15, communicating with the steam-collector, substantially as shown.

7. In an apparatus for manufacturing lamp-black, the combination, with a series of reservoirs and a hollow shaft carrying burners, and a scraper below the reservoirs, of a trough below the burners and scraper, a rake in the trough, a delivery-pipe connected to the trough, a roller having opposite recesses in the delivery-pipe, and means for operating the shaft and roller simultaneously, substantially as herein shown and described.

8. In an apparatus for manufacturing lamp-black, the combination, with a series of reservoirs and rotary burners below the same, of an air-supply pipe provided with branches projecting beneath the burners, substantially as described.

9. In an apparatus for manufacturing lamp-black, the combination, with the depositing or cooling surface, of a funnel below the said cooling-surface, and a scraper consisting of a pivoted lever having a scraper-blade on one arm and a weight on the other, the arm of the lever with the scraper-blade projecting into the funnel, substantially as described.

10. In an apparatus for manufacturing lamp-black, a depositing or cooling surface having depending concentric flanges, in combination with a scraper rotating between said flanges, substantially as and for the purpose set forth.

11. In an apparatus for manufacturing lamp-black, the combination, with a hollow shaft, of the plate 23, the slide 25, having recess 28 and adjustably secured to the said plate, and a burner-pipe connected to the said slide, substantially as herein shown and described.

In witness whereof I have hereunto set my hand in presence of two witnesses.

ROBERT DREYER.

Witnesses:
W. BINDEWALD,
B. ROI.